United States Patent
Parizi et al.

(10) Patent No.: US 11,150,737 B2
(45) Date of Patent: Oct. 19, 2021

(54) APPARATUS, SYSTEM, AND METHOD FOR WRIST TRACKING AND GESTURE DETECTION VIA TIME OF FLIGHT SENSORS

(71) Applicant: Facebook Technologies, LLC, Menlo Park, CA (US)

(72) Inventors: Farshid Salemi Parizi, Redmond, WA (US); Wolf Kienzle, Seattle, WA (US); Eric Michael Whitmire, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/820,148

(22) Filed: Mar. 16, 2020

(65) Prior Publication Data

US 2021/0286436 A1 Sep. 16, 2021

(51) Int. Cl.
*G06F 3/01* (2006.01)
*G01S 15/58* (2006.01)
*G01S 13/58* (2006.01)
*G01S 17/58* (2006.01)

(52) U.S. Cl.
CPC ............ *G06F 3/017* (2013.01); *G01S 13/581* (2013.01); *G01S 15/582* (2013.01); *G01S 17/58* (2013.01); *G06F 3/011* (2013.01)

(58) Field of Classification Search
None
See application file for complete search history.

(56) References Cited

U.S. PATENT DOCUMENTS

| 2014/0098018 A1* | 4/2014 | Kim | G06F 3/014 345/156 |
| 2015/0031299 A1* | 1/2015 | Holman | H04B 1/385 455/41.2 |
| 2015/0324000 A1* | 11/2015 | Park | G06F 3/014 345/156 |

(Continued)

FOREIGN PATENT DOCUMENTS

WO 2017/075611 A1 5/2017

OTHER PUBLICATIONS

Dementyev et al., "WristFlex: Low-Power Gesture Input with Wrist-Worn Pressure Sensors", Proceedings of the 27th Annual ACM Symposium on User Interface Software and Technology, Oct. 5-8, 2014, pp. 161-166.

(Continued)

*Primary Examiner* — Amare Mengistu
*Assistant Examiner* — Sarvesh J Nadkarni
(74) *Attorney, Agent, or Firm* — FisherBroyles, LLP

(57) ABSTRACT

The disclosed wrist-tracking apparatus includes (1) a wristband dimensioned to be donned on a wrist of a user of an artificial reality system and (2) a set of Time of Flight (ToF) sensors coupled to the wristband, wherein each of the ToF sensors comprises (A) an emitter that emits a modulated pulse of energy, (B) a receiver that facilitates detecting a reflection of the modulated pulse of energy, and (C) a processing circuit communicatively coupled to the emitter and the receiver, wherein the processing circuit calculates a time of flight for the modulated pulse of energy based at least in part on the modulated pulse of energy and the reflection. Various other apparatuses, systems, and methods are also disclosed.

17 Claims, 11 Drawing Sheets

(56) References Cited

U.S. PATENT DOCUMENTS

| | | | |
|---|---|---|---|
| 2016/0091980 A1 | 3/2016 | Baranski et al. | |
| 2017/0262064 A1* | 9/2017 | Ofir | G06F 3/0346 |
| 2018/0307507 A1* | 10/2018 | Kim | G06F 3/0233 |
| 2019/0098452 A1* | 3/2019 | Tyagi | H04B 17/27 |
| 2019/0121424 A1 | 4/2019 | Moseley | |
| 2019/0212821 A1 | 7/2019 | Keller et al. | |

OTHER PUBLICATIONS

Kim et al., "Digits: Freehand 3D Interactions Anywhere Using a Wrist-Worn Gloveless Sensor", Proceedings of the 25th Annual ACM Symposium on User Interface Software and Technology, Oct. 7-10, 2012, pp. 167-176.

Gong et al., "WristWhirl: One-handed Continuous Smartwatch Input using Wrist Gestures", Proceedings of the 29th Annual Symposium on User Interface Software and Technology, Oct. 16-19, 2016, pp. 861-872.

Pucihar et al., "The Missing Interface: Micro-Gestures on Augmented Objects", Extended Abstracts of the CHI Conference on Human Factors in Computing Systems, May 4-9, 2019, pp. 1-6.

McIntosh et al., "SensIR: Detecting Hand Gestures with a Wearable Bracelet using Infrared Transmission and Reflection", Proceedings of the 30th Annual ACM Symposium on User Interface Software and Technology, Oct. 22-25, 2017, pp. 593-597.

Zhang et al., "Tomo: Wearable, Low-Cost Electrical Impedance Tomography for Hand Gesture Recognition", Proceedings of the 28th Annual ACM Symposium on User Interface Software & Technology, Nov. 8-11, 2015, 7 pages.

Iravantchi et al., "Interferi: Gesture Sensing using On-Body Acoustic Interferometry", Proceedings of the CHI Conference on Human Factors in Computing Systems, May 4-9, 2019, pp. 1-13.

Whitmire et al., "Haptic Revolver: Touch, Shear, Texture, and Shape Rendering on a Reconfigurable Virtual Reality Controller", Proceedings of the CHI Conference on Human Factors in Computing Systems, Apr. 21-26, 2018, pp. 1-12.

Whitmire et al., "Aura: Inside-out Electromagnetic Controller Tracking", Proceedings of the 17th Annual International Conference on Mobile Systems, Applications and Services, Jun. 17-21, 2019, pp. 300-312

Parizi et al., "AuraRing: Precise Electromagnetic Finger Tracking", Proceedings of the ACM on Interactive, Mobile, Wearable and Ubiquitous Technologies, vol. 3, No. 4, Article 150, Dec. 2019, pp. 1-28.

Gong et al., "Jetto: Using Lateral Force Feedback for Smartwatch Interactions", Proceedings of the CHI Conference on Human Factors in Computing Systems, Apr. 21-26, 2018, pp. 1-14.

International Search Report and Written Opinion received for PCT Application Serial No. PCT/US2021/016336 dated Jun. 1, 2021, 10 pages.

* cited by examiner

APPARATUS, SYSTEM, AND METHOD FOR WRIST TRACKING AND GESTURE DETECTION VIA TIME OF FLIGHT SENSORS

BRIEF DESCRIPTION OF DRAWINGS AND APPENDIX

The accompanying Drawings illustrate a number of exemplary embodiments and are parts of the specification. Together with the following description, the Drawings demonstrate and explain various principles of the instant disclosure.

Figure 1:
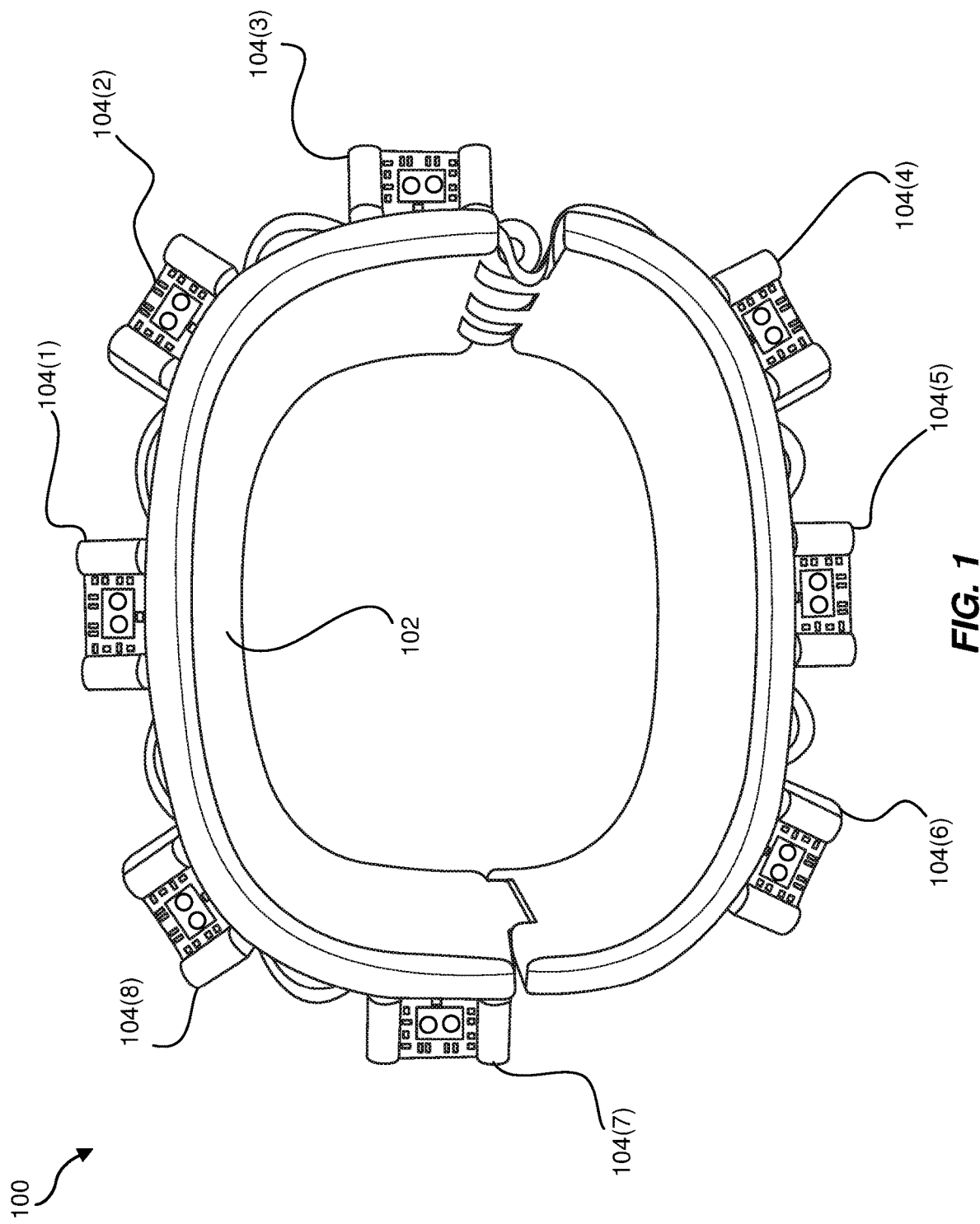
FIG. 1 is an illustration of an exemplary wrist-tracking apparatus that may be used in connection with embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

The present disclosure is generally directed to apparatuses, systems, and methods for wrist tracking and gesture detection via ToF sensors. As will be explained in greater detail below, these apparatuses, systems, and methods may provide numerous features and benefits.

Artificial reality often provides a rich, immersive experience in which users are able to interact with virtual objects and/or environments in one way or another. In this context, artificial reality may constitute a form of reality that has been altered by virtual objects for presentation to a user. Such artificial reality may include and/or represent virtual reality, augmented reality, mixed reality, hybrid reality, or some combination and/or variation one or more of the same.

Although artificial reality systems are commonly implemented for gaming and other entertainment purposes, such systems are also implemented for purposes outside of recreation. For example, governments may use them for military training simulations, doctors may use them to practice surgery, engineers may use them as visualization aids, and co-workers may use them to facilitate inter-personal interactions and collaboration from across the globe.

Many traditional artificial reality systems may incorporate hands-on controllers that enable users to enter input capable of modifying their artificial reality experiences. Unfortunately, these hands-on controllers may limit the users' mobility and/or movements, especially hand-based actions and/or gestures. To resolve these limitations, some artificial reality systems may incorporate traditional wearables capable of sensing a few motions and/or gestures made by users.

Traditional wearables may have certain shortcomings and/or deficiencies that inhibit their effectiveness and/or render them unsuitable for certain applications. For example, some artificial reality systems may incorporate traditional wearables whose devices and/or sensors are so big and/or bulky that the wearables become uncomfortable, cumbersome, and/or less user-friendly. Moreover, some artificial reality systems may incorporate traditional wearables whose sensors are sensitive and/or susceptible to manipulation by ambient light. Additionally or alternatively, such sensors may be incapable of properly detecting, sensing, and/or tracking wrist movements of and/or gestures made by users whose skin color absorbs more light than others (e.g., users with relatively darker complexions).

Furthermore, some traditional wearables may necessitate lengthy, complex, and/or frequent calibration procedures to account for certain variables and/or differences among users. Without such calibration procedures, the traditional wearables may generate and/or produce inaccurate data that impairs and/or ruins the users' artificial reality experiences. For example, such inaccurate data may result in and/or lead to a noticeable divide between the user's physical reality and the user's artificial reality. Beyond just being a nuisance to the user's overall experience, this type of divide may, in some cases, cause the user to become ill and/or nauseated.

The instant disclosure, therefore, identifies and addresses a need for additional apparatuses, systems, and methods for wrist tracking and/or gesture detection via ToF sensors. As will be described in greater detail below, to achieve such an objective, a wearable device may incorporate and/or deploy one or more relatively compact ToF sensors that are wrapped around a user's wrist. In some examples, these ToF sensors may support and/or facilitate measuring, calculating, and/or tracking the current angle of the user's wrist not by the intensity of light detected at the user's wrist but, rather, by the roundtrip flight times of intentional energy pulses emitted from and then detected in return at the user's wrist.

By using ToF sensors in this way, the wearable device may be able to achieve the objective of wrist tracking and/or gesture detection without a big and/or bulky footprint. Moreover, because ToF sensors rely on roundtrip flight times (as opposed to light intensity), the wearable device may be able to measure, calculate, and/or track the current angle of the user's wrist irrespective of the amount of ambient light surrounding the user. Additionally or alternatively, the wearable device may be able to properly detect, sense, and/or track wrist movements of and/or gestures made by the user irrespective of the user's skin tone and/or complexion.

In some examples, the terms "wearable" and "wearable device" may refer to any type or form of computing device that is worn by a user of an artificial reality system and/or visual display system as part of an article of clothing, an accessory, and/or an implant. In one example, a wearable device may include and/or represent a wristband secured to and/or worn by the wrist of a user. Additional examples of wearable devices include, without limitation, pendants, bracelets, rings, jewelry, anklebands, clothing, electronic textiles, shoes, clips, headsets, headbands, head-mounted displays, gloves, glasses, variations or combinations of one or more of the same, and/or any other suitable wearable accessories.

The following will provide, with reference to FIGS. 1-8, detailed descriptions of various apparatuses, systems, components, and/or implementations for wrist tracking and/or gesture detection via ToF sensors. The discussion corresponding to FIG. 9 will provide detailed descriptions of an exemplary method for wrist tracking and/or gesture detection via ToF sensors. The discussion corresponding to FIGS. 10-15 will provide detailed descriptions of types of exemplary artificial reality devices and/or systems that may facilitate and/or contribute to users' artificial reality experiences.

FIG. 1 illustrates an exemplary apparatus 100 capable of wrist tracking and/or gesture detection via ToF sensors. As illustrated in FIG. 1, exemplary apparatus 100 may include and/or represent a wristband 102 dimensioned to be donned on a wrist of a user of an artificial reality system. In some examples, exemplary apparatus 100 may also include and/or represent a set of ToF sensors 104(1), 104(2), 104(3), 104(4), 104(5), 104(6), 104(7), and/or 104(8) coupled to wristband 102. In one example, each of ToF sensors 104 (1)-(8) in FIG. 1 may include and/or represent an emitter that emits, produces, and/or releases a modulated pulse of energy (e.g., light and/or sound). In this example, each of ToF sensors 104(1)-(8) may also include and/or represent a receiver that facilitates receiving, detecting, and/or sensing a reflection of the modulated pulse of energy. Additionally or alternatively, each of ToF sensors 104(1)-(8) may include and/or represent a processing circuit that calculates a time of flight for the modulated pulse of energy based at least in part on the modulated pulse of energy and its reflection.

In some examples, the processing circuit of each ToF sensor may be communicatively coupled to the corresponding emitter and/or receiver. In one example, one or more of the ToF sensors may constitute and/or represent a stand-alone device and/or unit. Additionally or alternatively, one or more of the ToF sensors may involve and/or represent a somewhat distributed configuration and/or design. For example, the processing circuit of one or more of the ToF sensors may be included, applied, and/or implemented within a physical processor (such as physical processor 502 in FIG. 5) that is separate from and/or external to the device and/or unit that houses the corresponding emitter and/or receiver.

Various types and/or forms of ToF sensors may be implemented in exemplary apparatus 100. In one example, one or more of ToF sensors 104(1)-(8) may operate and/or function on electromagnetic radiation (e.g., radio waves, microwaves, infrared radiation, visible light, ultraviolet radiation, etc.). For example, the emitter of one or more of ToF sensors 104(1)-(8) may emit and/or produce pulses of infrared light, and the corresponding receiver may detect and/or sense reflections of such infrared pulses. As another example, one or more of ToF sensors 104(1)-(8) may operate and/or function on sound energy. For example, the emitter of one or more of ToF sensors 104(1)-(8) may emit and/or produce acoustic and/or sonar pulses, and the corresponding receiver may detect and/or sense reflections of such acoustic and/or sonar pulses.

In some examples, ToF sensors 104(1)-(8) may be coupled, attached, and/or secured to various parts and/or sections of wristband 102. In one example, some of ToF sensors 104(1)-(8) may be coupled, attached, and/or secured to opposing sides of wristband 102 relative to one another. For example, and as illustrated in FIG. 1, ToF sensor 104(1) may be coupled to and/or incorporated in the top side of wristband 102, and ToF sensor 104(5) may be coupled to and/or incorporated in the bottom side of wristband 102. In this example, ToF sensor 104(3) may be coupled to and/or incorporated in the right side of wristband 102, and ToF sensor 104(7) may be coupled to and/or incorporated in the left side of wristband 102.

In some examples, wristband 102 may include and/or represent a strap and/or band designed and/or dimensioned to at least partially encompass the user's wrist. Wristband 102 may include and/or contain a variety of different materials. Examples of such materials include, without limitation, cottons, polyesters, nylons, elastics, plastics, neoprene, rubbers, metals, woods, composites, combinations or variations of one or more of the same, and/or any other suitable materials. Wristband 102 may be defined and/or formed in a variety of shapes and/or sizes with the aim of securing apparatus 100 to the users' wrist. In one example, wristband 102 may include and/or represent one or more segments, links, and/or sections. Additionally or alternatively, wristband 102 may be adjustable to provide a one-size-fits-most feature.

In some embodiments, apparatus 100 may include and/or incorporate one or more additional components that are not represented and/or illustrated in FIG. 1. For example, although not necessarily illustrated and/or labeled in this way in FIG. 1, apparatus 100 may also include and/or incorporate physical processors, circuitry, transistors, resistors, capacitors, diodes, transceivers, and/or circuit boards, among other components.

Figure 2:
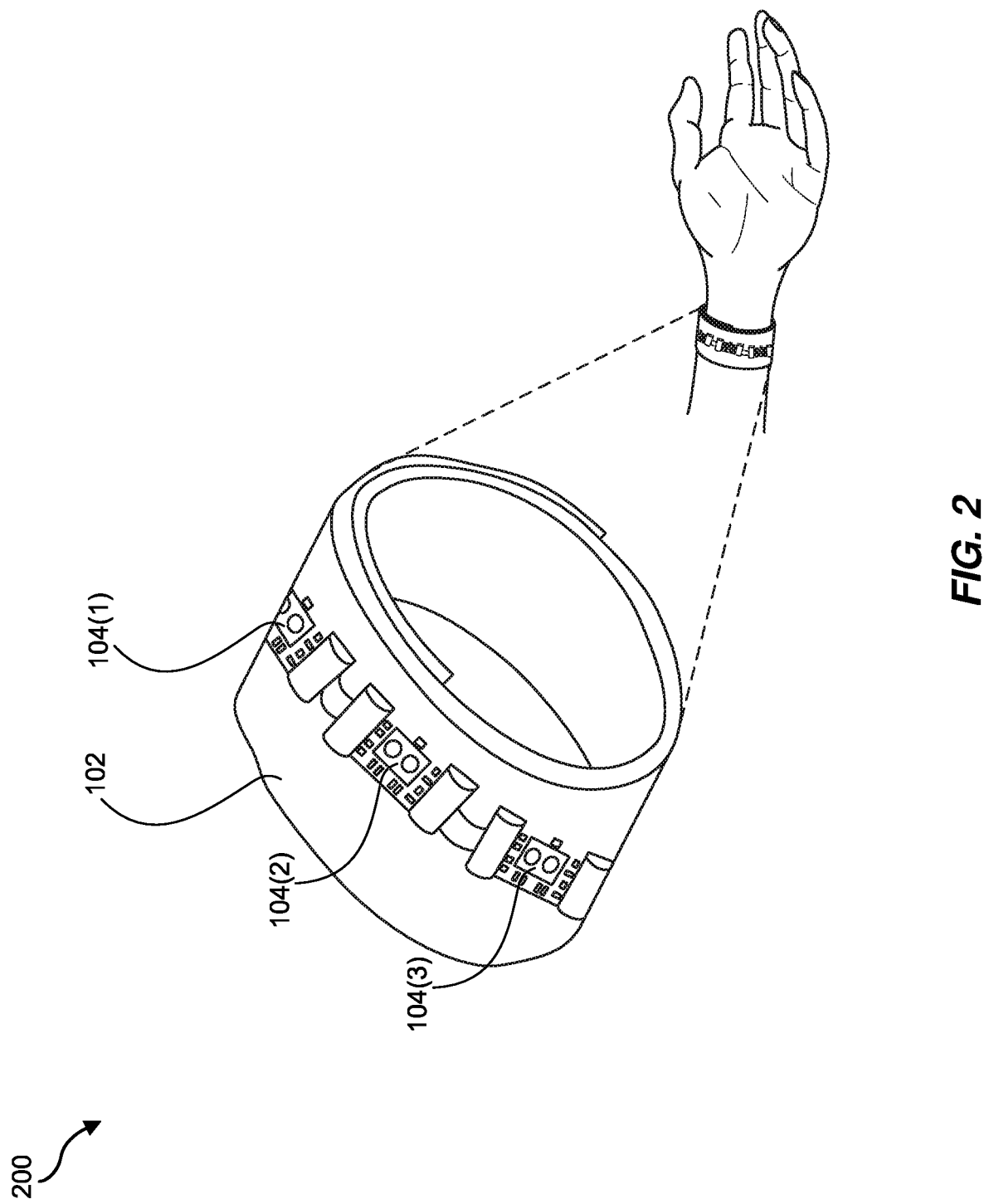
FIG. 2 is an illustration of an additional exemplary wrist-tracking apparatus that may be used in connection with embodiments of this disclosure.

FIG. 2 illustrates an exemplary apparatus 200 capable of wrist tracking and/or gesture detection via ToF sensors. As illustrated in FIG. 2, exemplary apparatus 200 may include and/or represent wristband 102 dimensioned to be donned on a wrist of a user of an artificial reality system. In some examples, exemplary apparatus 200 may also include and/or represent a set of ToF sensors coupled to wristband 102. This set of ToF sensors may include and/or represent ToF sensors 104(1)-104(3). In one example, ToF sensors 104(1)-(3) in FIG. 2 may each be coupled, attached, and/or secured to wristband 102 such that the corresponding emitter and/or receiver are oriented and/or focused toward a specific direction. For example, and as illustrated in FIG. 2, ToF sensors 104(1)-(3) may each be coupled, attached, and/or secured to wristband 102 such that the corresponding emitter and/or receiver are oriented and/or focused toward the user's wrist and/or hand, as opposed to being oriented and/or focused toward the user's forearm and/or bicep.

Figure 3:
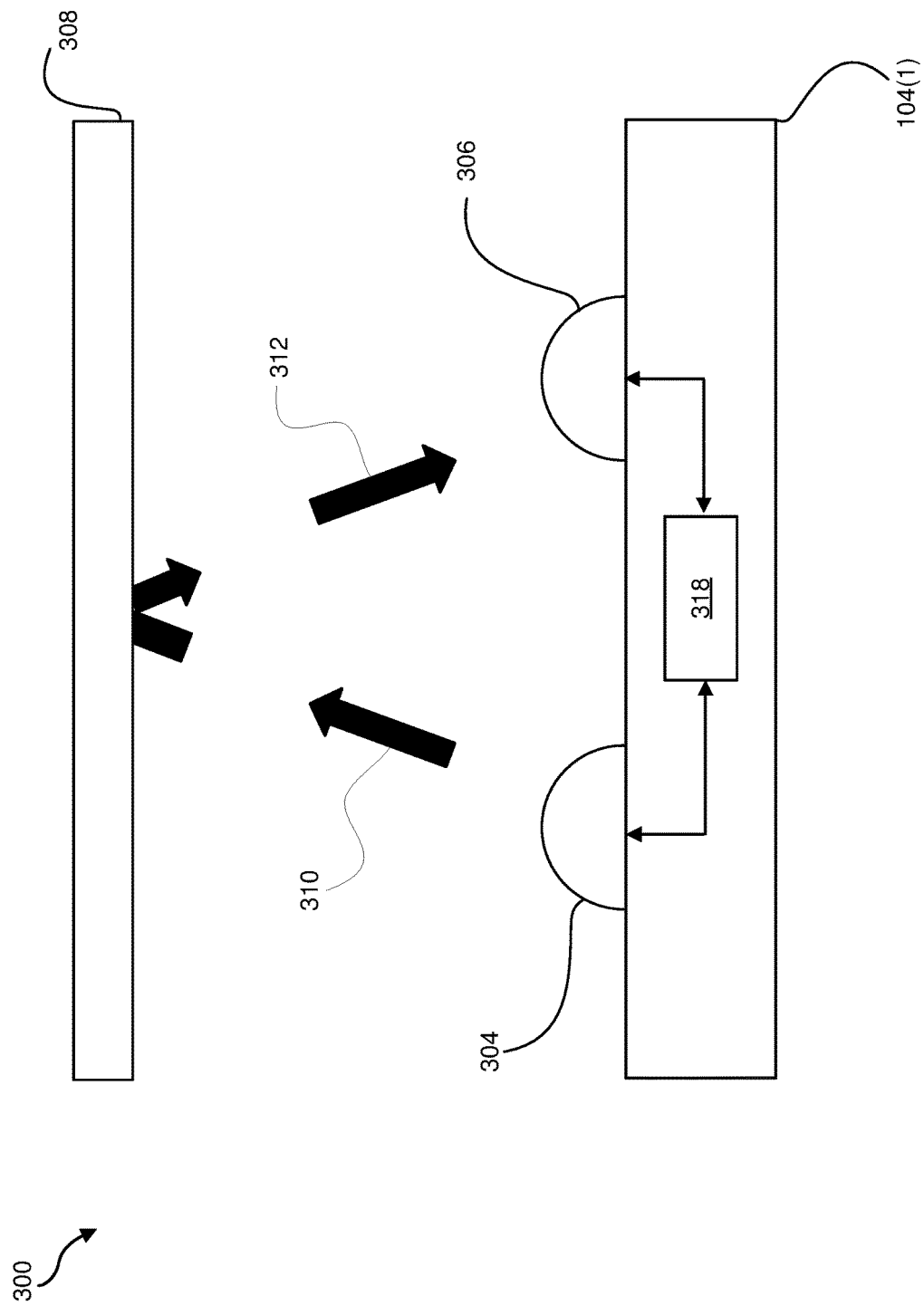
FIG. 3 is an illustration of an exemplary implementation of a Time of Flight (ToF) sensor incorporated into a wrist-tracking apparatus that may be used in connection with embodiments of this disclosure.

FIG. 3 is an illustration of an exemplary implementation 300 of ToF sensor 104(1) incorporated into wrist-tracking apparatus 100. In some examples, exemplary implementation 300 may demonstrate and/or show certain general principles of operation of ToF sensor 104(1). Other ToF sensors described herein may apply and/or implement the same general principles of operation as ToF sensor 104(1).

As illustrated in FIG. 3, exemplary ToF sensor 104(1) may include and/or represent an emitter 304, a receiver 306, and/or a processing circuit 318. In some examples, emitter 304 may emit a pulse of energy 310 (such as light or sound energy). In one example, emitter 304 may include and/or represent an infrared Light Emitting Diode (LED). Additional examples of emitter 304 include, without limitation, acoustic or sonar emitters, radio emitters, microwave emitters, visible light emitters, ultraviolet emitters, variations or combinations of one or more of the same, and/or any other suitable emitter.

In some examples, receiver 306 may facilitate detecting and/or sensing a reflection 312 of pulse of energy 310. In one example, receiver 306 may include and/or represent a photodiode tuned and/or designed to detect or sense infrared light and/or pulses. Additional examples of receiver 306 include, without limitation, acoustic or sonar receiver, photovoltaic cells, radio receivers, microwave receivers, visible light receivers, ultraviolet receivers, MicroElectroMechanical Systems (MEMSes), variations or combinations of one or more of the same, and/or any other suitable receiver.

In some examples, processing circuit 318 may represent any type or form of hardware-implemented processing device and/or circuitry capable of calculating the time of flight of pulses of energy emitted by emitter 304 and/or received by receiver 306. In one example, processing circuit 318 may interface with and/or be electrically coupled to emitter 304 and/or receiver 306. Examples of processing circuit 318 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable processing circuit.

In one example, and as illustrated in FIG. 3, processing circuit 318 may represent part of and/or be included in a stand-alone ToF sensor device and/or unit. However, although not necessarily illustrated in this way in FIG. 3, processing circuit 318 may alternatively represent part of, be included in, and/or be implemented by a discrete physical processor (such as physical processor 502 in FIG. 5) that is separate from and/or external to the device and/or unit that houses the corresponding emitter and/or receiver of the ToF sensor.

In some examples, emitter 304 of ToF sensor 104(1) may emit pulses of energy on a periodic basis. In one example, processing circuit 318 may direct and/or cause emitter 304 to emit pulse of energy 310 for the purpose of determining whether a target 308 is nearby and/or in range. For example, pulse of energy 310 may traverse and/or travel from emitter 304 toward target 308. In this example, target 308 may include and/or represent a wrist of a user. Additional examples of target 308 include, without limitation, a hand of the user, a finger or thumb of the user, an object worn by the user, portions of one or more of the same, variations or combinations of one or more of the same, and/or any other suitable target.

Upon reaching target 308, pulse of energy 310 may bounce and/or echo off target 308, thereby forming, creating, and/or producing reflection 312. As illustrated in FIG. 3, reflection 312 may head back toward and/or return to ToF sensor 104(1). In one example, as reflection 312 reaches ToF sensor 104(1), receiver 306 of ToF sensor 104(1) may receive reflection 312. In this example, the course and/or path of pulse of energy 310 and reflection 312 may collectively constitute and/or represent a roundtrip of pulse of energy 310.

In some examples, processing circuit 318 may identify, detect, and/or sense reflection 312 via receiver 306. In one example, processing circuit 318 may record, store, and/or access the launch and/or emission time of pulse of energy 310 as well as the reception and/or detection time of reflection 312. By doing so, processing circuit 318 may be able to measure the time differential between the emission of pulse of energy 310 and the detection of reflection 312. In other words, processing circuit 318 may calculate the time of flight and/or roundtrip flight time of pulse of energy 310 based at least in part on the launch and/or emission time of pulse of energy 310 and/or the reception and/or detection time of reflection 312.

In some examples, processing circuit 318 may calculate and/or compute the relative distance of target 308 from ToF sensor 104(1). For example, processing circuit 318 may convert the time of flight and/or roundtrip flight time of pulse of energy 310 to a distance measurement by the following formula:

$$\text{distance to target} = \frac{\text{speed} \times \text{time of flight}}{2}.$$

This measurement may indicate and/or represent the distance from ToF senor 104(1) to target 308. In one example, if ToF sensor 104(1) uses electromagnetic waves (e.g., infrared), processing circuit 318 may apply and/or rely on the speed of electromagnetic radiation (e.g., the speed of light in a vacuum) in the above formula. In another example, if ToF sensor 104(1) uses sound waves (e.g., sonar), processing circuit 318 may apply and/or rely on the speed of sound in the above formula.

Figure 4:
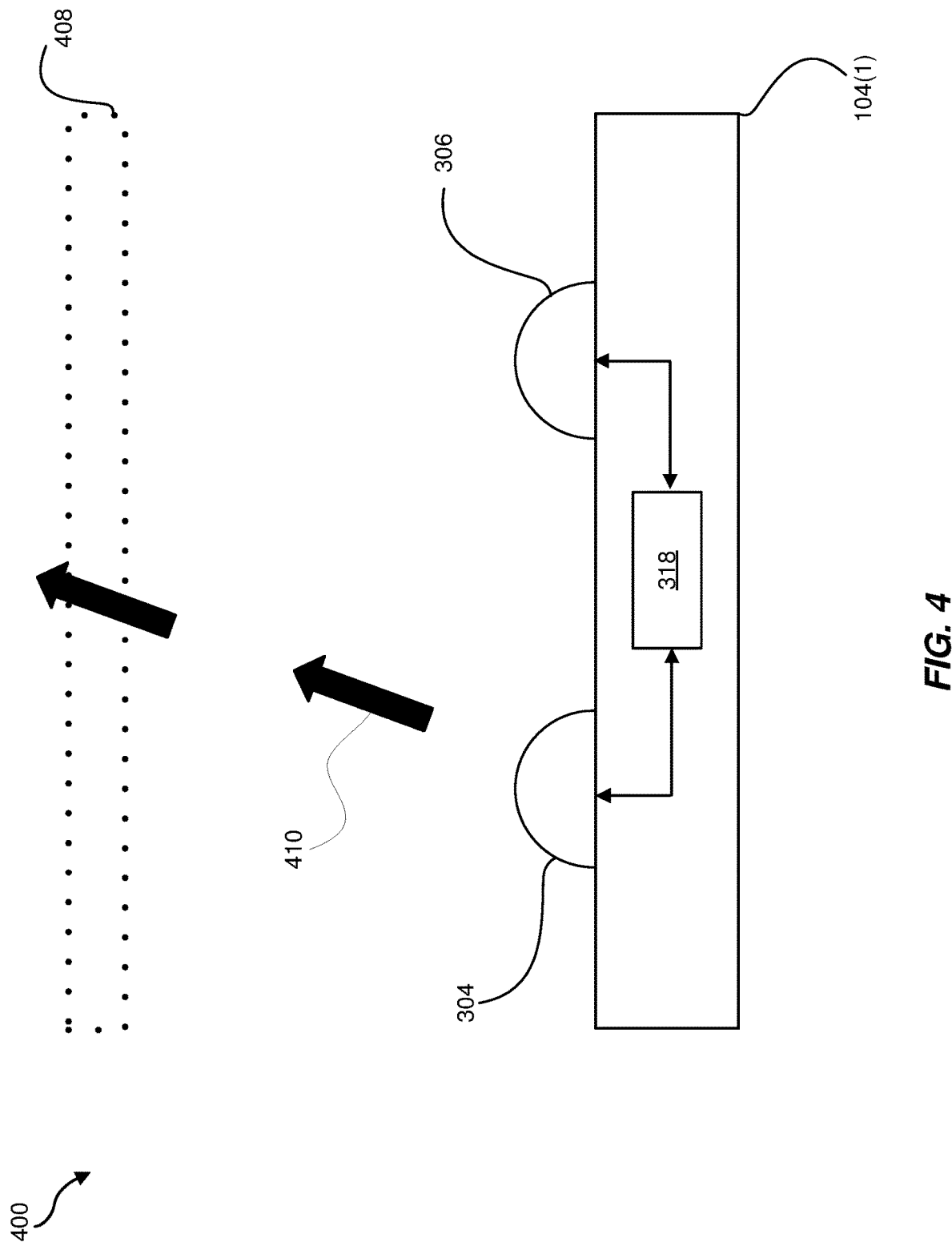
FIG. 4 is an illustration of an additional exemplary implementation of a ToF sensor incorporated into a wrist-tracking apparatus that may be used in connection with embodiments of this disclosure.

FIG. 4 is an illustration of an exemplary implementation 400 of ToF sensor 104(1) incorporated into wrist-tracking apparatus 100. In some examples, exemplary implementation 400 may demonstrate and/or show other general principles of operation of ToF sensor 104(1). Other ToF sensors described herein may also apply and/or implement these general principles of operation.

As described above in connection with FIG. 3, emitter 304 of ToF sensor 104(1) may emit pulses of energy on a periodic basis. As illustrated in FIG. 4, processing circuit 318 may direct and/or cause emitter 304 to emit pulse of energy 410 for the purpose of determining whether a target is nearby and/or in range. For example, pulse of energy 410 may traverse and/or travel from emitter 304 toward the user's wrist, hand, and/or fingers. In this example, no target may be present and/or in range. Instead, pulse of energy 410 may traverse and/or pass through a void 408 in the same place where target 308 was detected and/or located in FIG. 3.

Continuing with this example, because no target is present and/or in range, pulse of energy 410 may continue forward through void 408 without transforming into a detectable reflection. In other words, because no target is present and/or in range, pulse of energy 410 may fail to bounce and/or echo off void 408. As a result, receiver 306 of ToF sensor 104(1) may fail to receive a reflection formed, created, and/or produced from pulse of energy 410.

In some examples, processing circuit 318 may determine that no reflection of pulse 410 was received and/or detected via receiver 306. Accordingly, the time of flight of pulse 410 in FIG. 4 may be indefinite due at least in part to the receiver's failure to detect a corresponding reflection. As a result, processing circuit 318 may determine and/or conclude that no detectable target is present and/or in range at that time. In contrast, the time of flight of pulse 310 in FIG. 3 may be definite due at least in part to the receiver's successful detection of reflection 312 corresponding to pulse 310.

Figure 5:
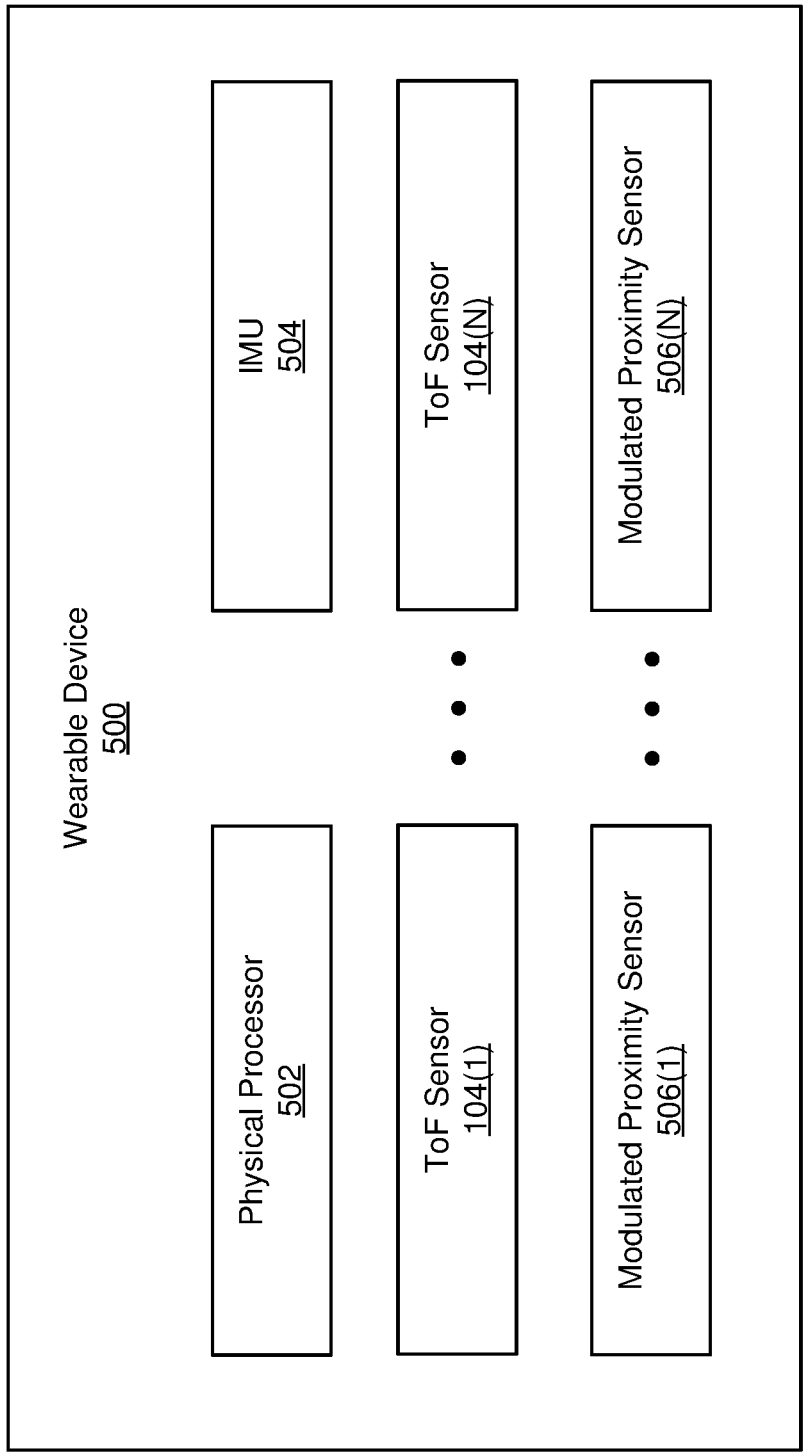
FIG. 5 is an illustration of an exemplary wearable device that may be used in connection with embodiments of this disclosure for wrist tracking and/or gesture detection.

FIG. 5 is an illustration of an exemplary wearable device 500 for wrist tracking and gesture detection via ToF sensors 104(1)-(N). In some examples, wearable device 500 may include and/or represent an implementation of wrist tracking apparatus 100. As illustrated in FIG. 5, wearable device 500 may include and/or represent a physical processor 502, an Inertial Measurement Unit (IMU) 504, a set of modulated proximity sensors 506(1)-(N), and/or ToF sensors 104(1)-(N). In one example, wearable device 500 may also include and/or represent a wristband secured to and/or worn by the wrist of a user. Additional examples of wearable device 500 include, without limitation, pendants, bracelets, rings, jewelry, anklebands, clothing, electronic textiles, shoes, clips, headsets, headbands, head-mounted displays, gloves, glasses, variations or combinations of one or more of the same, and/or any other suitable wearable accessories.

In one example, physical processor 502 may be communicatively coupled to IMU 504, modulated proximity sensors 506(1)-(N), and/or ToF sensors 104(1)-(N). Examples of physical processor 502 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

In some examples, physical processor 502 may calculate, compute, and/or determine the current angle of the user's wrist based at least in part on the distances between one or more of ToF sensors 104(1)-(N) and their corresponding target (e.g., target 308 in FIG. 3). For example, physical processor 502 may apply triangulation techniques to the readings obtained from ToF sensors 104(1)-(N). By doing so, physical processor 502 may be able to generate, create, and/or produce a 2 Degree of Freedom (DoF) representation of the user's wrist from those readings.

In another example, physical processor 502 may apply and/or implement a heuristic model that consumes and/or analyzes the readings obtained from ToF sensors 104(1)-(N). By doing so, physical processor 502 may be able to generate, create, and/or produce a 2-DoF representation of the user's wrist from those readings.

In addition to ToF sensors 104(1)-(N), physical processor 502 may rely on and/or leverage IMU 504 and/or one or more of modulated proximity sensors 506(1)-(N) to generate, create, and/or produce the 2-DoF representation of the user's wrist. In other words, data obtained from IMU 504 and/or modulated proximity sensors 506(1)-(N) may supplement the readings obtained from ToF sensors 104(1)-(N). Accordingly, physical processor 502 may collect telemetry data from ToF sensors 104(1)-(N), IMU 504, and/or modulated proximity sensors 506(1)-(N) and then use such telemetry data to arrive at and/or generate the 2-DoF representation of the user's wrist.

In some examples, physical processor 502 may repeatedly and/or continuously perform wrist-angle calculations and/or determinations. For example, physical processor 502 may collect and/or obtain data and/or measurements from ToF sensors 104(1)-(N), IMU 504, and/or modulated proximity sensors 506(1)-(N) on a repeated and/or continuous basis. Additionally or alternatively, physical processor 502 may repeatedly and/or continuously calculate and/or determine the current angle and/or orientation of the user's wrist by analyzing and/or comparing such data and/or measurement. By doing so, physical processor 502 may be able to continuously track and/or monitor the angle and/or orientation of the user's wrist.

In some examples, IMU 504 may each include and/or represent a variety of devices and/or components that generate various types or forms of data for the purpose of tracking the user's wrist. Examples of such devices and/or components include, without limitation, accelerometers, gyroscopes, magnetometers, electronic compasses, variations or combinations of one or more of the same, and/or any other suitable devices or components. In one example, IMU 504 may rely on and/or implement such devices and/or components to measure the angular velocity or rate of the user's wrist, the orientation of the user' wrist, the amount of force exerted by or on the user's wrist. In this example, IMU 504 may then provide and/or deliver data representative of these measurements to physical processor 502 to facilitate and/or contribute to the tracking of the user's wrist.

In some examples, modulated proximity sensors 506(1)-(N) may each include and/or represent an infrared emitter that is modulated at a specific frequency by a modulation circuit and/or an infrared receiver that is tuned to the modulated frequency of the infrared emitter. For example, one infrared emitter may be modulated at 38 kilohertz, and the corresponding infrared receiver may be tuned to the 38-kilohertz modulation of the infrared emitter. In this example, the modulation may enable proximity sensors 506(1)-(N) to filter out unwanted interference (e.g., ambient light) that could potentially alter their readings. In one example, modulated proximity sensors 506(1)-(N) may support and/or facilitate measuring the distance to the user's wrist, hand, and/or fingers by the intensity of light detected, as opposed to the roundtrip flight times of energy pulses.

Figure 6:
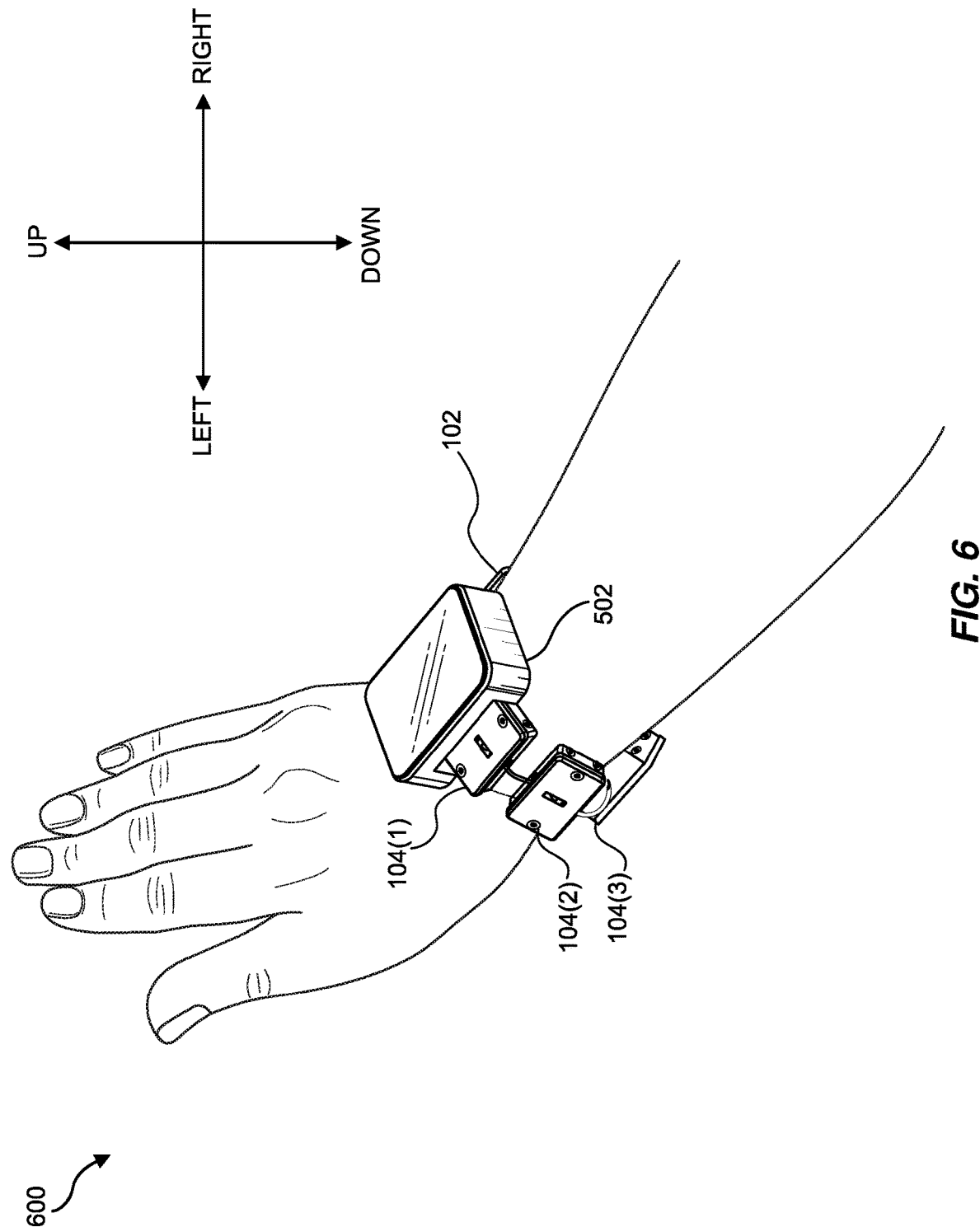
FIG. 6 is an illustration of an exemplary implementation of a wrist-tracking apparatus that detects a gesture made by a user according to embodiments of this disclosure.

FIG. 6 illustrates an exemplary implementation 600 of a wrist-tracking apparatus that includes and/or incorporates wristband 102, at least ToF sensors 104(1)-(3), and physical processor 502. In some examples, physical processor 502 may detect and/or identify one or more gestures made by a user donning the wrist-tracking apparatus based at least in part on various time of flight readings and/or distance readings obtained from ToF sensors 104(1)-(3). Examples of such gestures include, without limitation, upward motions made by the wrist or hand of the user, downward motions made by the wrist or hand of the user, rightward motions made by the wrist or hand of the user, leftward motions made by the wrist or hand of the user, angular or rotational motions made by the wrist or hand of the user, diagonal or twisting motions made by the wrist or hand of the user, pinching motions made by fingers of the user, variations or combinations of one or more of the same, and/or any other suitable gestures.

In some examples, in response to detecting and/or identifying a specific gesture, physical processor 502 may generate and/or produce an input command for a corresponding artificial reality system based at least in part on the specific gesture. In one example, physical processor 502 may facilitate modifying at least one virtual component of the artificial reality system to account for the specific gesture made by the user. Physical processor 502 may facilitate such modifications in a variety of different ways and contexts. For example, physical processor 502 may send a message to a head-mounted display worn by the user of the artificial reality system. Examples of this message include, without limitation, commands, computer-readable instructions, information and/or data indicative of the user making a specific gesture, combinations or variations of one or more of the same, and/or any other suitable message.

In some examples, the head-mounted display may then modify the user's artificial reality experience and/or visualization to account for the user making the specific gesture. For example, the specific gesture may signify and/or correspond to the selection of a virtual option, the pulling of a virtual trigger, and/or the opening of a virtual door within the user's artificial reality experience. In this example, the head-mounted display may generate and/or modify certain graphics or image frames for presentation to the user based at least in part on the specific gesture. These graphics or image frames may take into account that the user has selected the virtual option, pulling the virtual trigger, and/or opening the virtual door within the user's artificial reality experience.

In other examples, the head-mounted display may store the input command in connection with the artificial reality system without necessarily modifying a virtual component of the artificial reality system. For example, the head-mounted display may store a tag and/or metadata for the artificial reality system in response to the specific gesture made by the user. In this example, the tag and/or metadata may not necessarily modify any virtual components of the artificial reality system.

In some examples, physical processor 502 may facilitate and/or perform a calibration process that accounts and/or compensates for one or more drift errors and/or slippages. In one example, the wrist-tracking apparatus may initiate a user-specific calibration procedure at the outset of the user's artificial reality session. As part of this calibration procedure, the user may simply move his or her wrist up, down, left, and/or right in any order to enable the wrist-tracking apparatus to generate and/or gather the data needed to complete the proper calibration. This calibration procedure may account and/or compensate for certain slippages and/or drift errors to ensure that the wrist-tracking apparatus continues to return and/or provide accurate wrist angle data throughout the user's artificial reality session.

Figure 7:
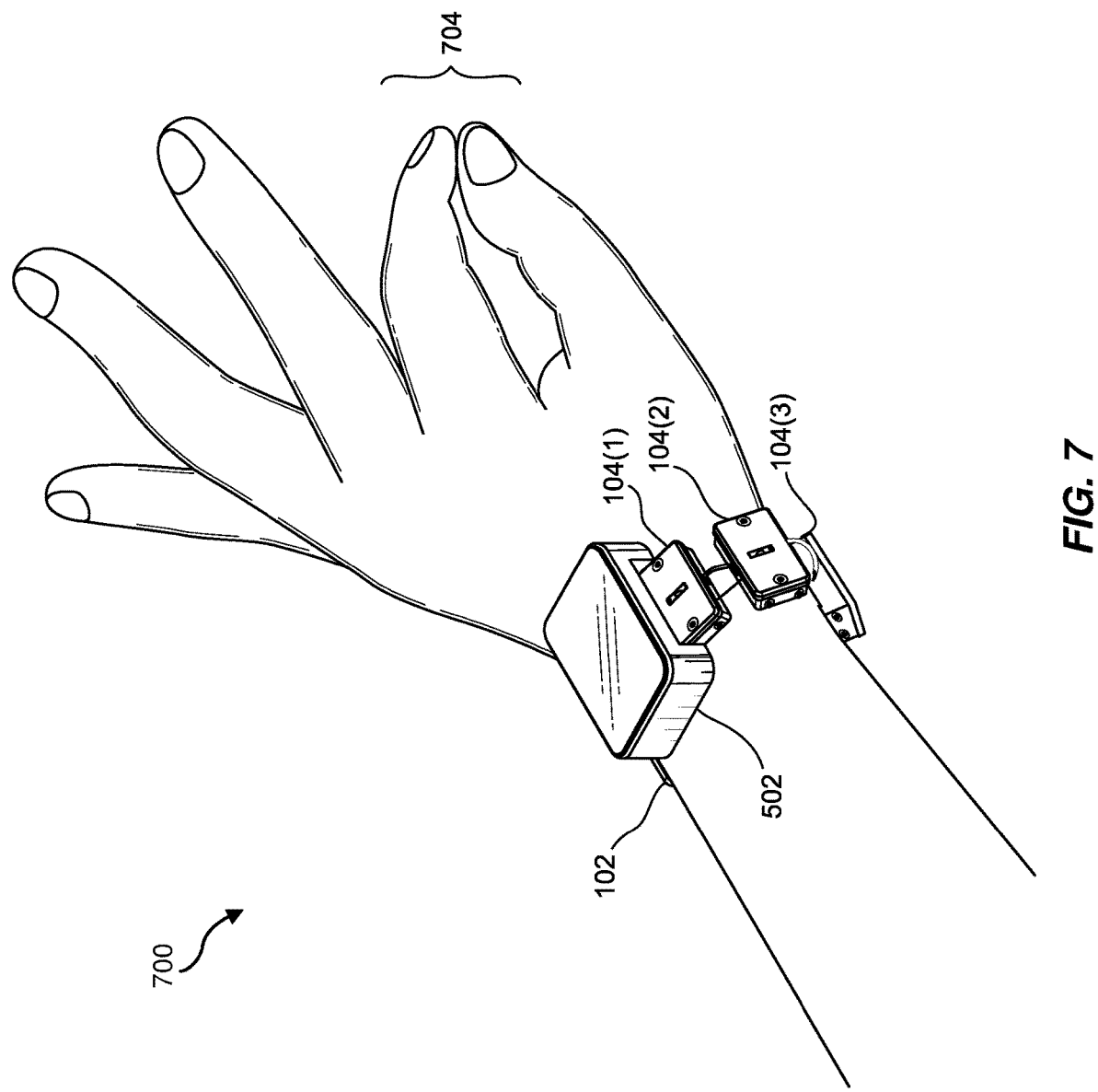
FIG. 7 is an illustration of an additional exemplary implementation of a wrist-tracking apparatus that detects a gesture made by a user according to embodiments of this disclosure.

FIG. 7 illustrates an exemplary implementation 700 of a wrist-tracking apparatus that includes and/or incorporates wristband 102, at least ToF sensors 104(1)-(3), and physical processor 502. In some examples, physical processor 502 may detect and/or identify a gesture 704 made by a user donning the wrist-tracking apparatus based at least in part on various time of flight readings and/or distance readings obtained from at least ToF sensors 104(1)-(3). In one example, gesture 704 may include and/or represent the action of pinching the user's left index finger and left thumb together.

Figure 8:
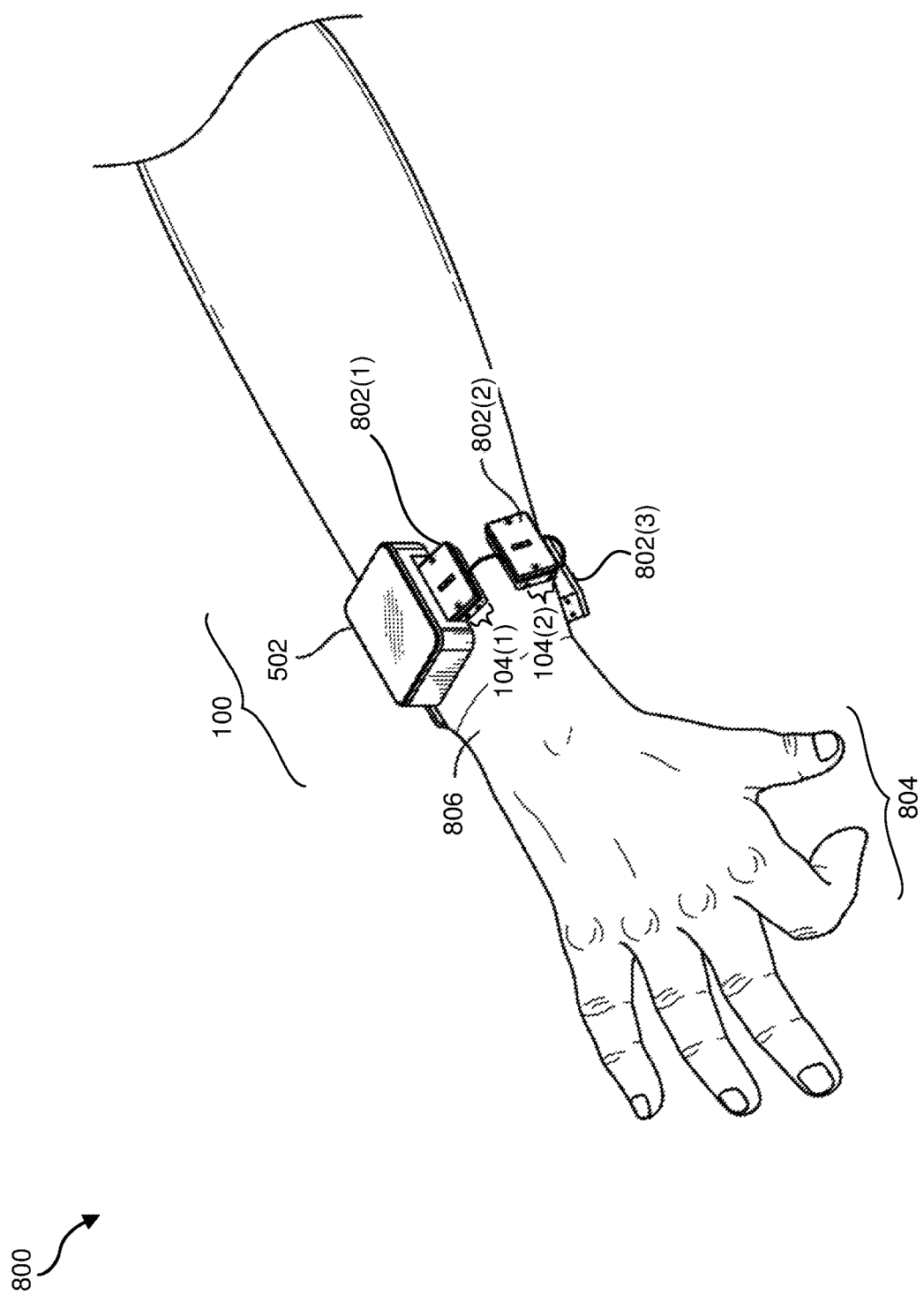
FIG. 8 is an illustration of an additional exemplary implementation of a wrist-tracking apparatus that detects a gesture made by a user according to embodiments of this disclosure.

FIG. 8 illustrates an exemplary implementation 800 of wrist-tracking apparatus 100 donned on a right wrist 806 of a user. As illustrated in FIG. 8, wrist-tracking apparatus 100 may include and/or represent physical processor 502 and a wristband composed of link components 802(1), 802(2), and 803(3) that are coupled in series to one another. In one example, each of link components 802(1)-(3) may include and/or represent a ToF sensor. For example, link component 802(1) may include and/or incorporate ToF sensor 104(1), and link component 802(2) may include and/or incorporate ToF sensor 104(2). In some examples, physical processor 502 may detect and/or identify a gesture 804 made by a user donning wrist-tracking apparatus 100 based at least in part on various time of flight readings and/or distance readings obtained from at least ToF sensors 104(1)-(2).

In one embodiment, gesture 804 may include and/or represent the action of flicking right wrist 806 of the user in a downward motion. In another embodiment, gesture 804 may include and/or represent the action of opening or closing the user's right hand. Additionally or alternatively, gesture 806 may include and/or represent the action of pressing the user's right index finger against a physical or virtual surface.

Figure 9:
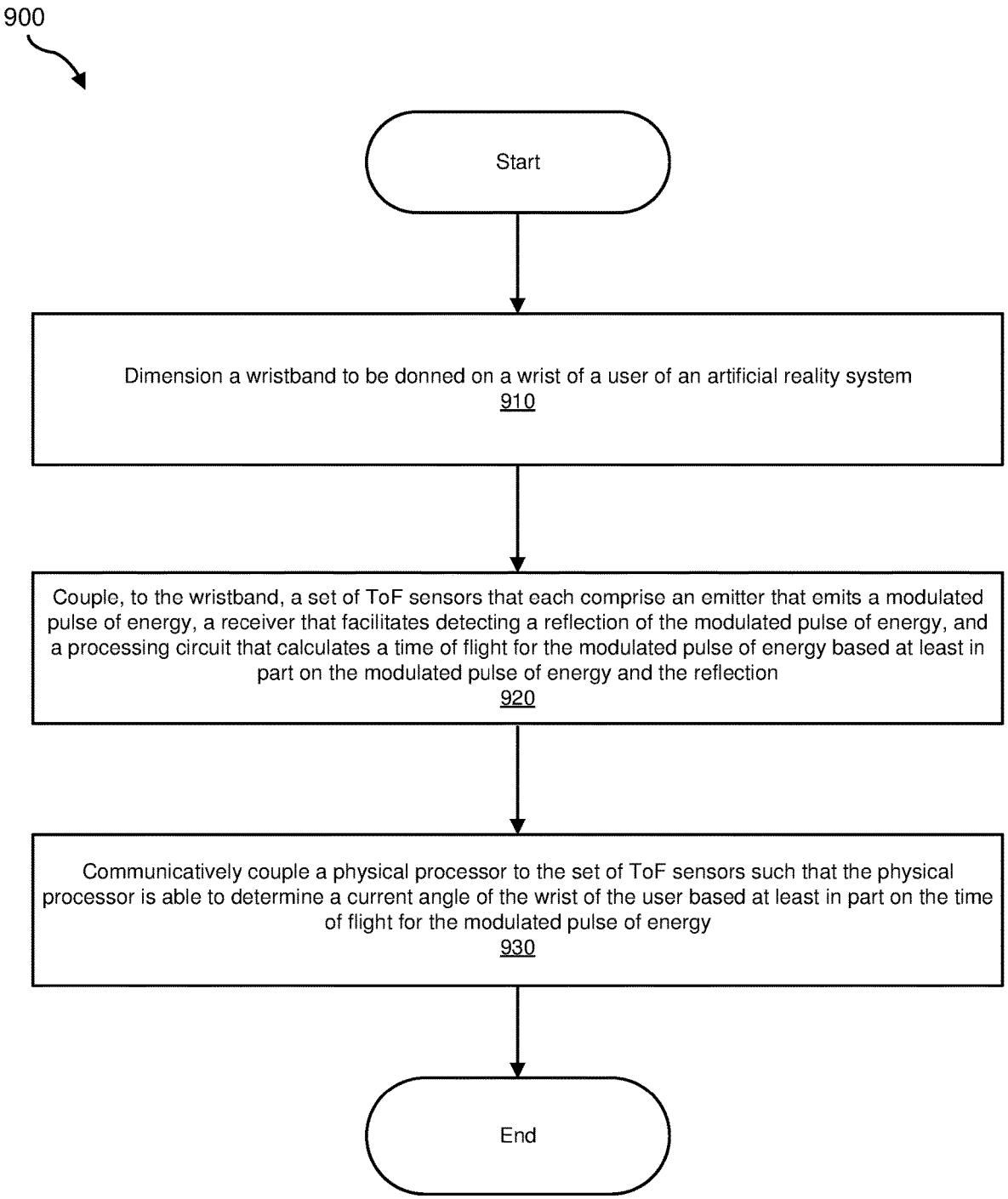
FIG. 9 is a flowchart of an exemplary method for wrist tracking and gesture detection via ToF sensors.

FIG. 9 is a flow diagram of an exemplary method 900 for wrist tracking and gesture detection via ToF sensors. The steps shown in FIG. 9 may be performed as part of a manufacturing and/or assembly process for a wrist-tracking apparatus. Additionally or alternatively, the steps shown in FIG. 9 may also incorporate and/or involve various sub-steps and/or variations consistent with the descriptions provided above in connection with FIGS. 1-8.

As illustrated in FIG. 9, method 900 may include a step 910 in which a wristband is dimensioned to be donned on the wrist of a user of an artificial reality system. In one example, a wearable manufacturer or subcontractor may manufacture, construct, and/or form a wristband for the purpose of securing a wrist-tracking apparatus to the wrist of a user. In this example, the wristband may include and/or represent one or more segments, links, and/or sections. Additionally or alternatively, the wristband may be adjustable to provide a one-size-fits-most feature.

As illustrated in FIG. 9, method 900 may also include a step 920 in which a set of ToF sensors are coupled to the wristband. In one example, the wearable manufacturer or subcontractor may couple and/or secure a set of ToF sensors to the wristband. In this example, the set of ToF sensors may each include and/or incorporate an emitter that emits a modulated pulse of energy, a receiver that facilitates detecting a reflection of the modulated pulse of energy, and a processing circuit that calculates a time of flight for the modulated pulse of energy based at least in part on the modulated pulse of energy and the reflection.

The set of ToF sensors may be coupled and/or secured to the wristband by any type or form of attachment mechanism. For example, the set of ToF sensors may be coupled and/or secured to the wristband by an adhesive (e.g., silicones, glues, and/or tapes). Additional examples of such attachment mechanisms include, without limitation, sticky surfaces, fasteners, press-fit fastenings, interference-fit fastenings, friction-fit fastenings, slip-fit fastenings, magnetic fasteners, locks, pins, screws, joints, ties, clamps, clasps, stitching, staples, zippers, solder, variations or combinations of one or more of the same, and/or any other suitable attachment mechanisms.

As illustrated in FIG. 9, method 900 may also include a step 930 in which a physical processor is communicatively coupled to the set of ToF sensors. In one example, the wearable manufacturer or subcontractor may communicatively couple the physical processor to the set of ToF sensors. By doing so, the wearable manufacturer or subcontractor may ensure that the physical processor is able to determine and/or calculate the current angle of the wrist of the user based at least in part on the time of flight for the modulated pulse of energy. As a result, the physical processor may facilitate continuous wrist tracking and gesture detection via the ToF sensors.

As explained above in connection with FIGS. 1-9, a wristband device may be able to achieve wrist tracking and gesture detection via ToF sensors and modulated proximity sensors in connection with an artificial reality system. In one example, the ToF sensors and modulated proximity sensors may be embedded in the wristband device to support continuous tracking of a user's wrist orientation. In this example, the wristband device may use the distance measurements from the ToF sensors and modulated proximity sensors in a sequential and/or combined way to extrapolate the current angle of the user's wrist orientation. The wristband device may implement and/or deploy a simple heuristic model that converts the data and/or readings obtained from the ToF sensors into a 2-DoF wrist angle.

In one example, the user may initiate and/or complete a one-time user-specific calibration process for the wristband device. As part of this calibration process, the wristband device may capture and/or collect data from the ToF sensors and/or modulated proximity sensors as the user moves his or her wrist and/or hand up, down, left, and right in any order. Upon completion of this calibration process, the wristband device may be able to account for and/or address certain slippages and/or drift errors that could potentially occur throughout the user's artificial reality session. The wrist-tracking accuracy of the wristband device may be improved by considering and/or processing certain hand-tracking data from the headset of the artificial reality system during the calibration process.

EXAMPLE EMBODIMENTS

Example 1: A wrist-tracking apparatus comprises (1) a wristband dimensioned to be donned on a wrist of a user of an artificial reality system, and (2) a set of ToF sensors coupled to the wristband, wherein each of the ToF sensors comprises (A) an emitter that emits a modulated pulse of energy, (B) a receiver that facilitates detecting a reflection of the modulated pulse of energy, and (C) a processing circuit communicatively coupled to the emitter and the receiver, wherein the processing circuit calculates a time of flight for the modulated pulse of energy based at least in part on the modulated pulse of energy and the reflection.

Example 2: The wrist-tracking apparatus of Example 1, further comprising at least one physical processor communicatively coupled to the ToF sensors, wherein the physical processor determines a current angle of the wrist of the user based at least in part on the time of flight for the modulated pulse of energy.

Example 3: The wrist-tracking apparatus of Example 2, wherein (1) the set of ToF sensors comprises (A) a first ToF sensor coupled to a one side of the wristband and (B) a second ToF sensor coupled to an opposing side of the wristband and (2) the physical processor determines the current angle of the wrist of the user based at least in part on (A) a first time of flight of a first modulated pulse of energy emitted by the first ToF sensor and (B) a second time of flight of a second modulated pulse of energy emitted by the second ToF sensor.

Example 4: The wrist-tracking apparatus of Example 3, wherein the first time of flight of the first modulated pulse of energy is either (1) indefinite due at least in part to a failure to detect a reflection of the first modulated pulse of energy or (2) definite due at least in part to a successful detection of a reflection of the first modulated pulse of energy.

Example 5: The wrist-tracking apparatus of Example 3, wherein the physical processor detects a gesture made by the user based at least in part on the first time of flight and the second time of flight.

Example 6: The wrist-tracking apparatus of Example 5, wherein the physical processor generates, in response to detecting the gesture made by the user, an input command for the artificial reality system that accounts for the gesture.

Example 7: The wrist-tracking apparatus of Example 6, wherein the physical processor facilitates modifying at least one virtual component of the artificial reality system to account for the gesture based at least in part on the input command.

Example 8: The wrist-tracking apparatus of Example 5, wherein the physical processor implements a heuristic model to generate a 2 Degree of Freedom (DoF) representation of the current angle of the user's wrist based at least in part on the based at least in part on the first time of flight and the second time of flight.

Example 9: The wrist-tracking apparatus of Example 5, wherein (1) the gesture comprises at least one of (A) an upward motion made by the wrist of the user, (B) a downward motion made by the wrist of the user, (C) a leftward motion made by the wrist of the user, and/or (D) a rightward motion made the wrist of the user, and (2) the physical processor performs, based at least in part on the gesture, a calibration process that accounts for at least one drift error to ensure that readings of the angle of the user's wrist remain accurate throughout an operating session.

Example 10: The wrist-tracking apparatus of Example 5, further comprising at least one Inertial Measurement Unit (IMU) communicatively coupled to the physical processor, wherein the physical processor (1) receives orientation data from the IMU and (2) detects the gesture made by the user based at least in part on the first time of flight, the second time of flight, and the orientation data from the IMU.

Example 11: The wrist-tracking apparatus of Example 10, wherein the gesture comprises at least one of (1) a pinching motion made by fingers of the user, (2) a hand motion made by a hand of the user, and/or (3) a wrist motion made by the wrist of the user.

Example 12: The wrist-tracking apparatus of Example 5, further comprising a set of modulated proximity sensors communicatively coupled to the physical processor, wherein the physical processor (1) receives light-intensity data from the set of modulated proximity sensors and (2) detects the gesture made by the user based at least in part on the first time of flight, the second time of flight, and the light-intensity data from the set of modulated proximity sensors.

Example 13: The wrist-tracking apparatus of Example 1, wherein the ToF sensors are coupled to the wristband such that the emitter and the receiver are oriented toward a wrist of the user.

Example 14: The wrist-tracking apparatus of Example 1, wherein the modulated pulse of energy comprises at least one of (1) a modulated pulse of electromagnetic radiation and/or (2) a modulated pulse of sound energy.

Example 15: An artificial reality system comprising (1) a head-mounted display and (2) a wearable device communicatively coupled to the head-mounted display, the wearable device comprising (A) a set of Time of Flight (ToF) sensors coupled to the wristband, wherein each of the ToF sensors comprises (I) an emitter that emits a modulated pulse of energy, (II) a receiver that facilitates detecting a reflection of the modulated pulse of energy, and (III) a processing circuit communicatively coupled to the emitter and the receiver, wherein the processing circuit calculates a time of flight for the modulated pulse of energy based at least in part on the modulated pulse of energy and the reflection and (B) at least one physical processor communicatively coupled to the ToF sensors, wherein the physical processor determines a current angle of the wrist of the user based at least in part on the time of flight for the modulated pulse of energy.

Example 16: The artificial reality system of Example 15, wherein (1) the set of ToF sensors comprises (A) a first ToF sensor coupled to a one side of the wristband and (B) a second ToF sensor coupled to an opposing side of the wristband and (2) the physical processor determines the current angle of the wrist of the user based at least in part on (A) a first time of flight of a first modulated pulse of energy emitted by the first ToF sensor and (B) a second time of flight of a second modulated pulse of energy emitted by the second ToF sensor.

Example 17: The artificial reality system of Example 15, wherein the first time of flight of the first modulated pulse of energy is either (1) indefinite due at least in part to a failure to detect a reflection of the first modulated pulse of energy or (2) definite due at least in part to a successful detection of a reflection of the first modulated pulse of energy.

Example 18: The artificial reality system of Example 15, wherein the physical processor detects a gesture made by the user based at least in part on the first time of flight and the second time of flight.

Example 19: The artificial reality system of Example 17, wherein the physical processor generates, in response to detecting the gesture made by the user, an input command for the artificial reality system that accounts for the gesture.

Example 20: A non-transitory computer-readable medium comprising one or more computer-executable instructions that, when executed by a physical processor of a wearable device secured to a wrist of a user, cause the wearable device to (1) emit modulated pulses of energy via emitters included in a set of Time of Flight (ToF) sensors of the wearable device, (2) detect reflections of the modulated pulses of energy via receivers included in the set of ToF sensors of the wearable device, (3) calculate times of flight for the modulated pulses of energy based at least in part on the modulated pulses of energy and the reflections, and then (4) determine a current angle of the wrist of the user based at least in part on the times of flight for the modulated pulses of energy.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
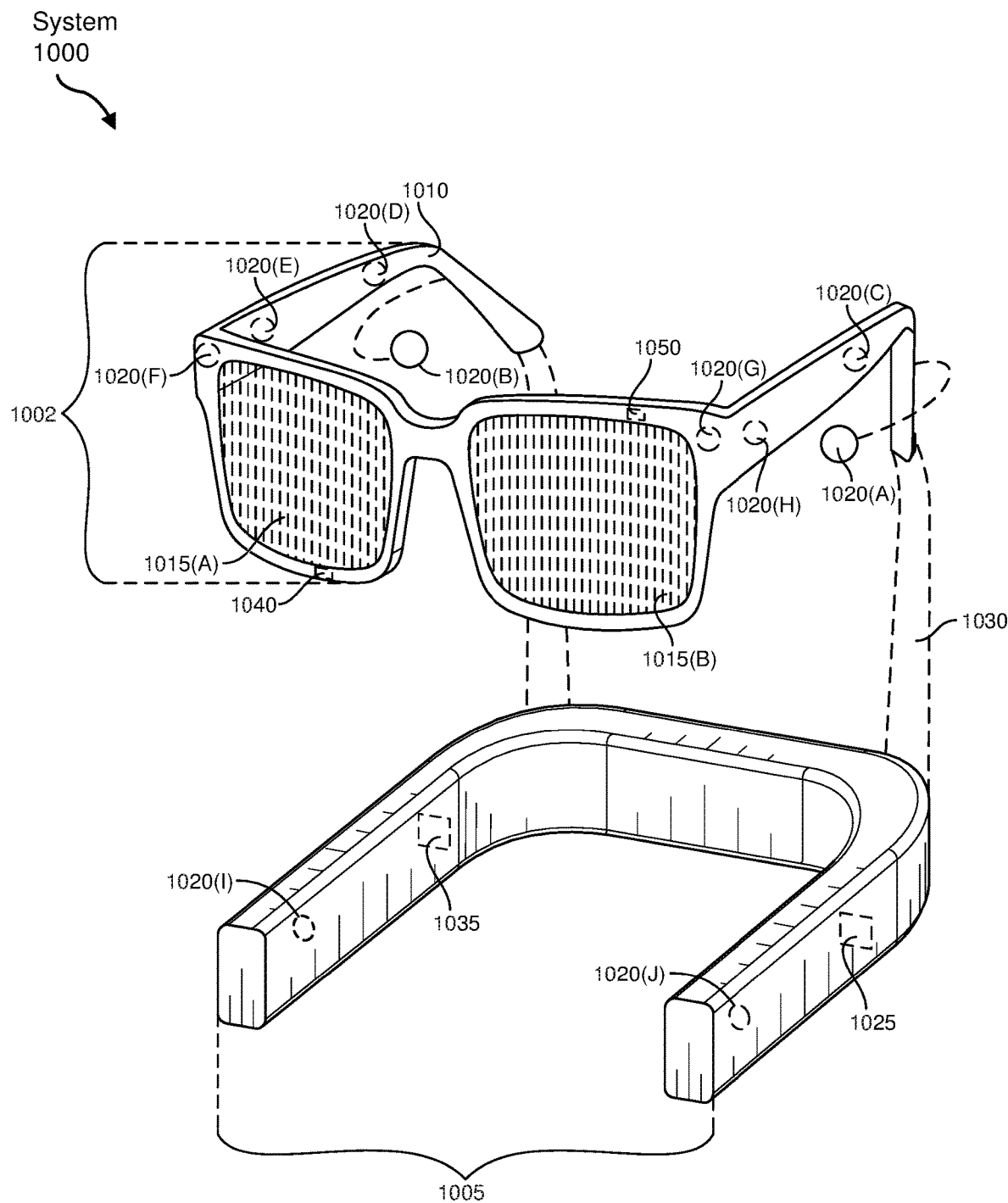
FIG. 10 is an illustration of exemplary augmented-reality glasses that may be used in connection with embodiments of this disclosure.
Figure 11:
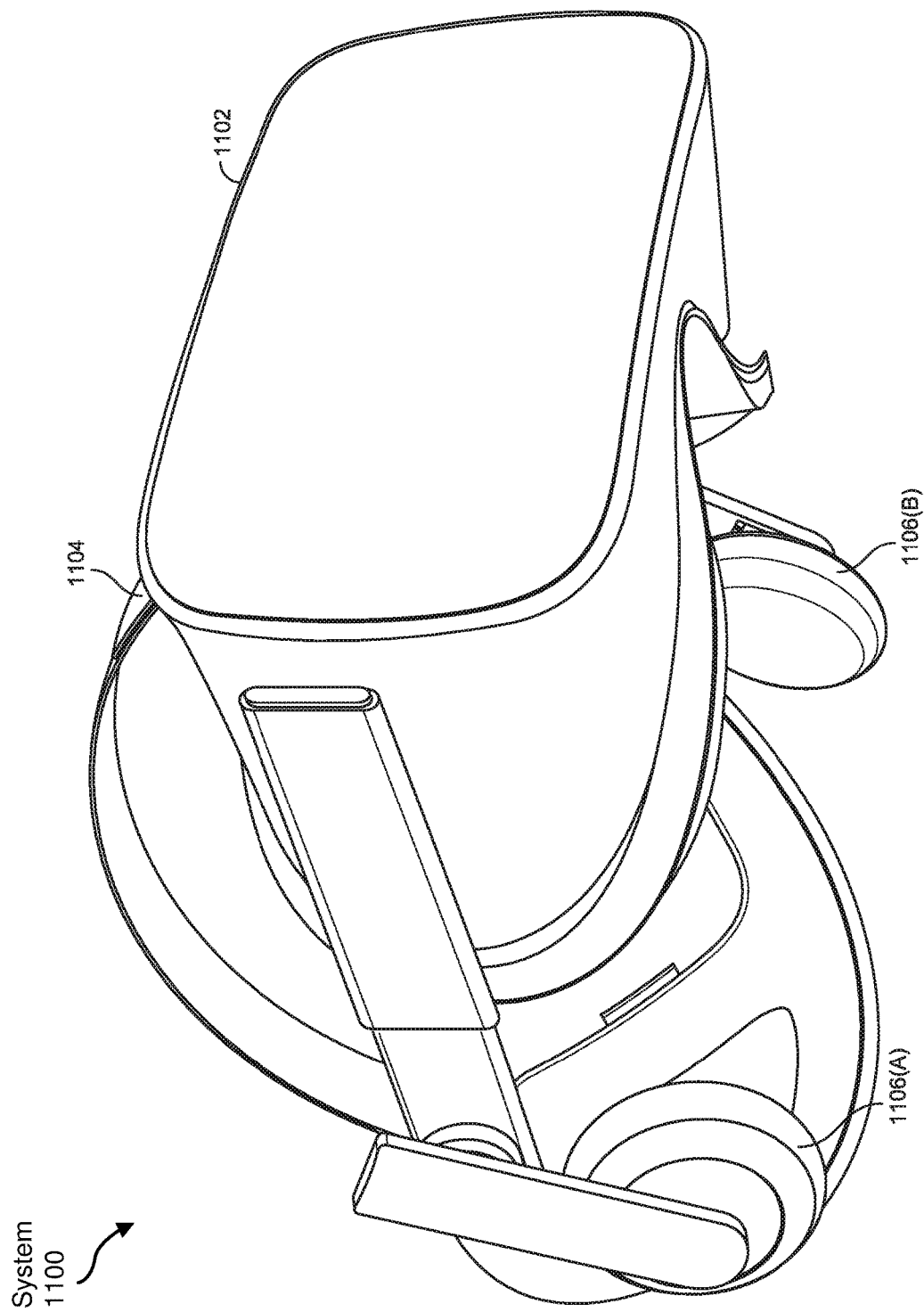
FIG. 11 is an is an illustration of an exemplary virtual-reality headset that may be used in connection with embodiments of this disclosure.

Turning to FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

In some examples, augmented-reality system 1000 may also include a microphone array with a plurality of acoustic transducers 1020(A)-1020(J), referred to collectively as acoustic transducers 1020. Acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 11 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information.

In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned in a variety of different ways, including along the length of the temples, across the bridge, above or below display devices 1015(A) and 1015(B), or some combination thereof. Acoustic transducers 1020 may also be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers, other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(1) and 1020(J)) that are part of the microphone array (or potentially form their own microphone subarray). Neckband 1005 may also include a controller 1025 and a power source 1035.

Acoustic transducers 1020(1) and 1020(J) of neckband 1005 may be configured to detect sound and convert the detected sound into an electronic format (analog or digital). In the embodiment of FIG. 10, acoustic transducers 1020(1) and 1020(J) may be positioned on neckband 1005, thereby increasing the distance between the neckband acoustic transducers 1020(1) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1000 and/or virtual-reality system 1100 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A wrist-tracking apparatus comprising:
    a wristband dimensioned to be donned on a wrist of a user of an artificial reality system;
    a set of Time of Flight (ToF) sensors coupled to the wristband, wherein each of the ToF sensors comprises:
        an emitter that emits a modulated pulse of energy;
        a receiver that facilitates detecting a reflection of the modulated pulse of energy; and
        a processing circuit communicatively coupled to the emitter and the receiver, wherein the processing circuit calculates a time of flight for the modulated pulse of energy by measuring a time differential between the emission of the modulated pulse of energy and the detection of the reflection; and
    at least one physical processor communicatively coupled to the ToF sensors, wherein the physical processor:
        implements a heuristic model to generate a 2 Degree of Freedom (2-DoF) representation of a current angle of the wrist of the user based at least in part on times of flight calculated by the ToF sensors and distances between the ToF sensors;
        detects a gesture made by the user based at least in part on the 2-DoF representation of the current angle of the wrist of the user;
        generates, in response to detecting the gesture made by the user, an input command for the artificial reality system that accounts for the gesture; and
        facilitates modifying at least one virtual component of the artificial reality system to account for the gesture based at least in part on the input command.

2. The wrist-tracking apparatus of claim 1, wherein:
    the set of ToF sensors comprises:
        a first ToF sensor coupled to one side of the wristband; and
        a second ToF sensor coupled to an opposing side of the wristband;
    the physical processor determines the current angle of the wrist of the user based at least in part on:
        a first time of flight of a first modulated pulse of energy emitted by the first ToF sensor; and
        a second time of flight of a second modulated pulse of energy emitted by the second ToF sensor.

3. The wrist-tracking apparatus of claim 2, wherein the first time of flight of the first modulated pulse of energy is at least one of:
    indefinite due at least in part to a failure to detect a reflection of the first modulated pulse of energy; or
    definite due at least in part to a successful detection of a reflection of the first modulated pulse of energy.

4. The wrist-tracking apparatus of claim 2, wherein the physical processor detects the gesture made by the user based at least in part on the first time of flight and the second time of flight.

5. The wrist-tracking apparatus of claim 4, wherein the physical processor implements the heuristic model to generate a 2 Degree of Freedom (DoF) representation of the current angle of the user's wrist based at least in part on the first time of flight and the second time of flight.

6. The wrist-tracking apparatus of claim 4, further comprising at least one Inertial Measurement Unit (IMU) communicatively coupled to the physical processor, wherein the physical processor:
    receives orientation data from the IMU; and
    detects the gesture made by the user based at least in part on the first time of flight, the second time of flight, and the orientation data from the IMU.

7. The wrist-tracking apparatus of claim 6, wherein the gesture comprises at least one of:
    a pinching motion made by fingers of the user;
    a hand motion made by a hand of the user; or
    a wrist motion made by the wrist of the user.

8. The wrist-tracking apparatus of claim 4, further comprising a set of modulated proximity sensors communicatively coupled to the physical processor, wherein the physical processor:
    receives light-intensity data from the set of modulated proximity sensors; and
    detects the gesture made by the user based at least in part on the first time of flight, the second time of flight, and the light-intensity data from the set of modulated proximity sensors.

9. The wrist-tracking apparatus of claim 1, wherein:
    the gesture comprises at least one of:
        an upward motion made by the wrist of the user;
        a downward motion made by the wrist of the user;
        a leftward motion made by the wrist of the user; or
        a rightward motion made the wrist of the user; and
    the physical processor performs, based at least in part on the gesture, a calibration process that accounts for at least one drift error to ensure that readings of the current angle of the user's wrist remain accurate throughout an operating session.

10. The wrist-tracking apparatus of claim 1, wherein the ToF sensors are coupled to the wristband such that the emitter and the receiver are oriented toward a wrist of the user.

11. The wrist-tracking apparatus of claim 1, wherein the modulated pulse of energy comprises at least one of:
    a modulated pulse of electromagnetic radiation; or
    a modulated pulse of sound energy.

12. An artificial reality system comprising:
    a head-mounted display; and
    a wearable device communicatively coupled to the head-mounted display, the wearable device comprising:
        a set of Time of Flight (ToF) sensors coupled to the wearable device, wherein each of the ToF sensors comprises:

an emitter that emits a modulated pulse of energy;
a receiver that facilitates detecting a reflection of the modulated pulse of energy; and
a processing circuit communicatively coupled to the emitter and the receiver, wherein the processing circuit calculates a time of flight for the modulated pulse of energy by measuring a time differential between the emission of the modulated pulse of energy and the detection of the reflection; and
at least one physical processor communicatively coupled to the ToF sensors, wherein the physical processor:
implements a heuristic model to generate a 2 Degree of Freedom (2-DoF) representation of a current angle of a wrist of a user based at least in part on times of flight calculated by the ToF sensors and distances between the ToF sensors;
detects a gesture made by the user based at least in part on the 2-DoF representation of the current angle of the wrist of the user;
generates, in response to detecting the gesture made by the user, an input command for the artificial reality system that accounts for the gesture; and
facilitates modifying at least one virtual component of the artificial reality system to account for the gesture based at least in part on the input command.

13. The artificial reality system of claim 12, wherein:
the set of ToF sensors comprises:
a first ToF sensor coupled to one side of the wearable device wristband; and
a second ToF sensor coupled to an opposing side of the wearable device; and
the physical processor determines the current angle of the wrist of the user based at least in part on:
a first time of flight of a first modulated pulse of energy emitted by the first ToF sensor; and
a second time of flight of a second modulated pulse of energy emitted by the second ToF sensor.

14. The artificial reality system of claim 13, wherein the first time of flight of the first modulated pulse of energy is at least one of:

indefinite due at least in part to a failure to detect a reflection of the first modulated pulse of energy; or
definite due at least in part to a successful detection of a reflection of the first modulated pulse of energy.

15. The artificial reality system of claim 13, wherein the physical processor detects a gesture made by the user based at least in part on the first time of flight and the second time of flight.

16. The artificial reality system of claim 15, wherein the physical processor generates, in response to detecting the gesture made by the user, an input command for the artificial reality system that accounts for the gesture.

17. A non-transitory computer-readable medium comprising one or more computer-executable instructions that, when executed by a processor of a wearable device secured to a wrist of a user, cause the wearable device to:
emit modulated pulses of energy via emitters included in a set of Time of Flight (ToF) sensors of the wearable device;
detect reflections of the modulated pulses of energy via receivers included in the set of ToF sensors of the wearable device;
calculate times of flight for the modulated pulses of energy by measuring time differential between the emission of the modulated pulses of energy and the detection of the reflections;
implement a heuristic model to generate a 2 Degree of Freedom (2-DoF) representation of a current angle of the wrist of the user based at least in part on the times of flight and distances between the ToF sensors;
detect a gesture made by the user based at least in part on the 2-DoF representation of the current angle of the wrist of the user;
generate, in response to detecting the gesture made by the user, an input command for an artificial reality system that accounts for the gesture; and
facilitate modifying at least one virtual component of the artificial reality system to account for the gesture based at least in part on the input command.

* * * * *